(12) United States Patent
Elseser

(10) Patent No.: US 11,655,872 B2
(45) Date of Patent: May 23, 2023

(54) JOINING ELASTIC MATERIAL TO METAL

(71) Applicant: Buffers USA, Inc., Jacksonville, FL (US)

(72) Inventor: Jeffrey Elseser, St. Augustine, FL (US)

(73) Assignee: BUFFERS USA, INC., Jacksonville, FL (US)

( * ) Notice: Subject to any disclaimer, the term of this patent is extended or adjusted under 35 U.S.C. 154(b) by 37 days.

(21) Appl. No.: 17/308,780

(22) Filed: May 5, 2021

(65) Prior Publication Data

US 2021/0254684 A1 Aug. 19, 2021

(51) Int. Cl.
*F16F 1/371* (2006.01)
*B29C 45/14* (2006.01)
(Continued)

(52) U.S. Cl.
CPC ........ *F16F 1/371* (2013.01); *B29C 45/14344* (2013.01); *B29C 45/34* (2013.01);
(Continued)

(58) Field of Classification Search
CPC . F16F 1/371; F16F 1/373; F16F 1/377; B29C 2045/1495; B29C 45/34
See application file for complete search history.

(56) References Cited

U.S. PATENT DOCUMENTS

| 1,855,769 A | * | 4/1932 | Paton | ...................... | F16F 1/376 248/635 |
| 3,008,601 A | | 11/1961 | Cahne | | |

(Continued)

FOREIGN PATENT DOCUMENTS

| AU | 721974 A | | 9/1997 | | |
| DE | 10031246 C1 | * | 10/2001 | ................ | F02F 1/24 |

(Continued)

*Primary Examiner* — Melanie Torres Williams
(74) *Attorney, Agent, or Firm* — Browdy and Neimark, P.L.L.C.

(57) ABSTRACT

A shock-absorbing or vibration-absorbing assembly includes a metal base and an elastic shock-absorbing or vibration-absorbing material secured to the metal base. A top surface of the metal base has at least one orifice extending from the top surface to at least one hollow chamber beneath the top surface. The hollow chamber occupies a planar area of the metal base parallel to the top surface that is larger than a planar area of the metal base that is occupied by the orifice at the top surface. The elastic material is secured to the metal base by the elastic material filling the orifice and the hollow chamber of the metal base and the elastic material filling a region above the top surface of the metal base that has a cross-sectional area parallel to the top surface of the metal base that is larger than the planar area of the metal base that is occupied by the orifice at the top surface of the metal base. The elastic material is secured to the metal base by placing the metal base against a mold having a hollow space to be filled with the elastic material. The elastic material is injected into the hollow chamber and orifice of the metal base and into the hollow space of the mold. The mold is removed from the metal base, so that the elastic material is secured to the metal base by the elastic material filling the orifice and the hollow chamber of the metal base and the elastic material filling a region above the top surface of the metal base that corresponds to the hollow space of the mold.

20 Claims, 6 Drawing Sheets

(51) Int. Cl.
*B29C 45/34* (2006.01)
*F16F 1/373* (2006.01)
*B29L 31/00* (2006.01)

(52) U.S. Cl.
CPC ...... *F16F 1/373* (2013.01); *B29C 2045/1495* (2013.01); *B29L 2031/721* (2013.01); *F16F 2224/025* (2013.01); *F16F 2226/04* (2013.01); *F16F 2230/0005* (2013.01)

(56) References Cited

U.S. PATENT DOCUMENTS

| | | |
|---|---|---|
| 3,343,770 A | 9/1967 | Szonn |
| 3,684,272 A | 8/1972 | Ticknor |
| 3,840,975 A | 10/1974 | Slessor |
| 3,948,500 A | 4/1976 | Korbuly et al. |
| 5,725,203 A | 3/1998 | Lloyd |
| 6,060,004 A | 5/2000 | Takeuchi |
| 6,928,944 B2 | 8/2005 | Stoll |
| 10,393,212 B2 | 8/2019 | Ikawa et al. |
| 2015/0258870 A1* | 9/2015 | Gollapalli ............ B60G 11/22 280/124.108 |
| 2016/0207234 A1 | 7/2016 | Krahnert et al. |
| 2017/0016262 A1* | 1/2017 | Kwak .................... E05F 5/022 |

FOREIGN PATENT DOCUMENTS

| | | | |
|---|---|---|---|
| DE | 102018208603 A1 * | 5/2019 | |
| FR | 411157 A * | 12/1909 | |
| FR | 3016852 A1 | 7/2015 | |
| KR | 0130869 Y1 | 12/1998 | |

\* cited by examiner

JOINING ELASTIC MATERIAL TO METAL

TECHNICAL FIELD

The field of this invention generally relates to the joining of elastic materials to metals, and more particularly to bumpers, buffers, suspensions, and the like, having shock-absorbing or vibration-absorbing material attached to metal, for vehicles, cargo containers, port and terminal equipment, etc.

BACKGROUND

Bumpers, buffers, suspensions, and the like for vehicles, containers, and related equipment typically include an elastic material such as rubber, polyurethane, or other elastomeric material attached to a metal such as steel by techniques such as vulcanization or adhesion by an adhesive material.

One mechanism for securing elastic materials to metal is by securing a portion of the elastic material within a confined area. For example, Cahne, U.S. Pat. No. 3,008,601 discloses TEFLON secured to a metal frying pan by a process that includes etching the metal with acid to produce cavities or pits in the metal, such that when the metal is coated with a layer of TEFLON, the portions of the layer that fill the cavities or pits hold the layer to the metal. Ticknor, U.S. Pat. No. 3,684,272 discloses a conformable fender in which rubber material is secured to the hull of a boat with the aid of rigid plates, welded to the hull, that are inserted into the rubber such that a portion of the rubber is positioned between the rigid plates and the hull.

SUMMARY

It is an object of the present invention to provide buffers, bumpers, suspensions, and the like in which elastic materials are joined to metal through a simple geometric configuration that secures the elastic material to the metal in a manner that avoids cracking of the elastic materials or tearing of the elastic material off of the metal as a result of impact, vibration, or shear forces.

In one aspect, the invention features a shock-absorbing or vibration-absorbing assembly that includes a metal base and an elastic shock-absorbing or vibration-absorbing material secured to the metal base. The metal base has a top surface, the top surface having at least one orifice extending from the top surface to at least one hollow chamber beneath the top surface. The hollow chamber occupies a planar area of the metal base parallel to the top surface that is larger than a planar area of the metal base that is occupied by the orifice at the top surface. The elastic material is secured to the metal base due to the elastic material filling the orifice and the hollow chamber of the metal base and the elastic material filling a region above the top surface of the metal base. The region above the top surface of the metal base that is filled by the elastic material has a cross-sectional area parallel to the top surface of the metal base that is larger than the planar area of the metal base that is occupied by the orifice at the top surface of the metal base.

The connection between the elastic and metal materials provided by the invention helps to prevent cracking of the elastic material or tearing of the softer elastic material off of the metal base as a result of impact, vibration, or shear forces, due to the simple geometric configuration that secures the elastic material to the metal, and in particular due to the inventive way in which the metal base is shaped so that the impact-absorbing or vibration-absorbing material has a physically strong bonding to the metal base. The invention enables the shock-absorbing or vibration-absorbing assembly to withstand tough shock impact applications, or stop objects in motion, or essentially eliminate vibrations transferred between mechanical structures, while withstanding physical impact or vibration pressure that puts compression and shear forces on the material that is impacted upon.

In certain embodiments, the metal base is a plate having substantially planar top and bottom surfaces. There can be a plurality of orifices and a plurality of hollow chambers, and the plurality of orifices extend from the top surface of the metal base to respective ones of the plurality of hollow chambers, which extend from the orifices to the bottom surface of the metal base, and the elastic material within the hollow chambers has a bottom surface that is flush with the bottom surface of the metal base. The planar area of the metal base that is occupied by the orifice at the top surface of the metal base has a shape that can be oval, round, rectangular, or any other shape that connects to the larger chamber, and the planar area of the metal base parallel to the top surface that is occupied by the hollow chamber has a larger shape. The metal base includes at least one fastening hole for securing the metal base in a fixed position. The planar area occupied by the orifice and the planar area occupied by the hollow chamber are selected such that the elastic material located in the hollow chamber will not pass through the orifice or shear off due to breakage under impact or vibration forces experienced by the assembly, due to tensile strength of the elastic material.

In another aspect, the invention features a method of securing an elastic shock-absorbing or vibration-absorbing material to a metal base. The metal base has a top surface, the top surface having at least one orifice extending from the top surface to at least one hollow chamber beneath the top surface. The hollow chamber occupies a planar area of the metal base parallel to the top surface that is larger than a planar area of the metal base that is occupied by the orifice at the top surface. The metal base is placed against a mold having a hollow space to be filled with elastic shock-absorbing or vibration-absorbing material. The elastic material is injected into the hollow chamber and orifice of the metal base and into the hollow space of the mold. The mold is removed from the metal base, so that the elastic material is secured to the metal base by the elastic material filling the orifice and the hollow chamber of the metal base and the elastic material filling a region above the top surface of the metal base that corresponds to the hollow space of the mold and that has a cross-sectional area parallel to the top surface of the metal base that is larger than the planar area of the metal base that is occupied by the orifice at the top surface of the metal base.

This aspect of the invention provides a convenient process for manufacturing a shock-absorbing or vibration-absorbing assembly that includes a metal base and an elastic material secured to the metal base, having a simple geometric configuration that secures the elastic material to the metal so that the impact-absorbing or vibration-absorbing material has a physically strong bonding to the metal base.

In certain embodiments, the hollow chamber extends from the orifice to a bottom surface of the metal base. An injection gating tool is provided, having a hollow passageway through which the elastic material can be injected. The metal base is placed between the mold and the injection gating tool. The elastic material is injected through a passageway in the injection gating tool into the hollow chamber and orifice of the metal base and into the hollow space of the mold. When the mold is removed from the metal base, the injection gating tool is also removed from the metal base. A filling gate portion of the elastic material is removed after the injection gating tool has been removed from the metal base. After the step of removing the filling gate portion, the elastic material with the hollow chamber has a bottom surface that is flush with the bottom surface of the metal base. The mold includes a vent passageway.

The details of various embodiments of the invention are set forth in the accompanying drawings and the description below. Numerous other features and advantages of the invention will be apparent from the description, the drawings, and the claims.

DETAILED DESCRIPTION

Figure 1:
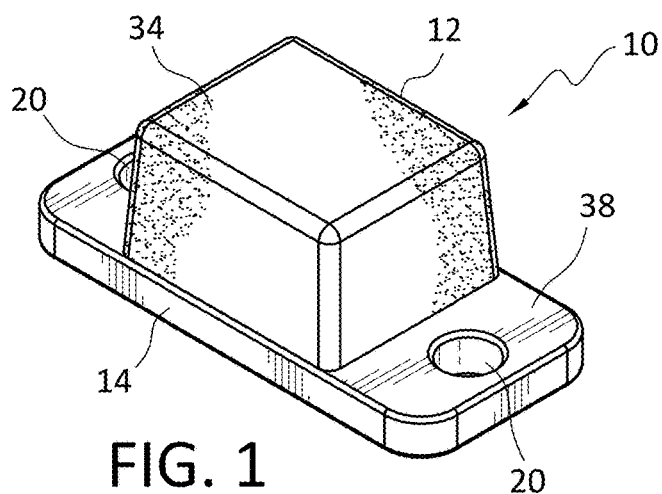
FIG. 1 is an isometric view of a bumper assembly according to the invention.

Applicant has designed a way to adhere or connect shock or vibration absorbing materials such as polyurethane or rubber to metals such as steel.

With reference to FIGS. 1-8, there is shown a bumper assembly 10 having an elastic bumper 12 made from polyurethane or rubber that is attached to a metal base 14, in this case a steel plate. Bumper assembly 10 is used as a flipper impact bumper on spreaders for container cranes, the impact typically creating an impact force perpendicular to the top surface 34 of elastic bumper 12 However, as the flipper pivots downward and hits an object at an angle, there can be a sideways component to the impact force, which can lead to a shear force that can be even more likely than the perpendicular component of the impact force to lead to breakage of an elastic bumper or to separation of an elastic bumper from a metal base. The configuration illustrated in FIGS. 1-8 helps to prevent such breakage or separation.

Bumper assembly 10 is fastened to the flipper by bolts that pass through fastening holes 20 of bumper assembly 10 and through similar holes in the flipper, the bolts being held by nuts on the back side of the flipper. Alternatively, bumper assembly 10 can be fastened to the flipper by clamps or slide-in frame or similar removable attachment solutions. Bumper assembly 10, in one embodiment, has a height from the bottom of the metal base 14 to the top of elastic bumper 12 of about one and a half inches, and metal base 14 has a length of about five inches, a width of about two inches, and a thickness of about ⅜ inch.

Similar configurations can be employed for other applications in which a strong bond is desired between a softer impact-absorbing or vibration-absorbing material to a metal base or multiple metal bases.

Figure 2:
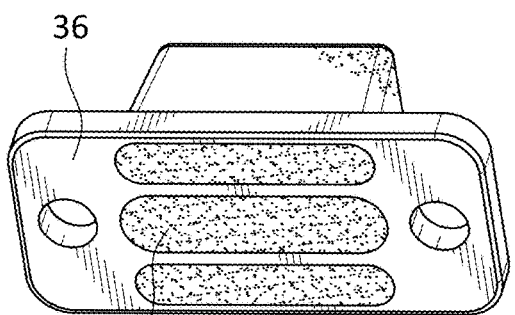
FIG. 2 is an oblique view of the bumper assembly of FIG. 1, rotated to illustrate the bottom surface of the bumper assembly.
Figure 3:
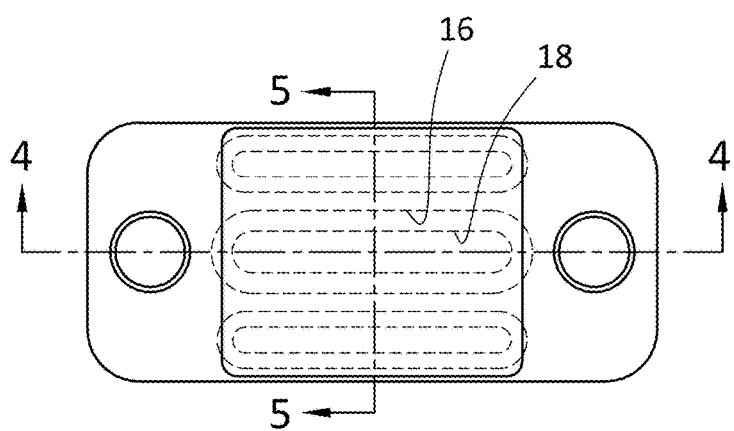
FIG. 3 is a top view of the bumper assembly of FIG. 1.
Figure 4:
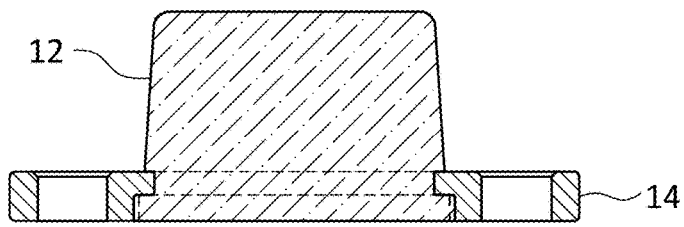
FIG. 4 is a cross-sectional side view of the bumper assembly taken along line 4-4 of FIG. 3.
Figure 5:
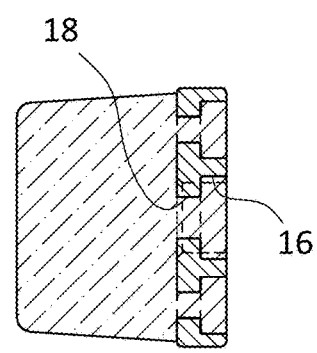
FIG. 5 is a cross-sectional side view of the bumper assembly taken along line 5-5 of FIG. 3.
Figures 6, 7:
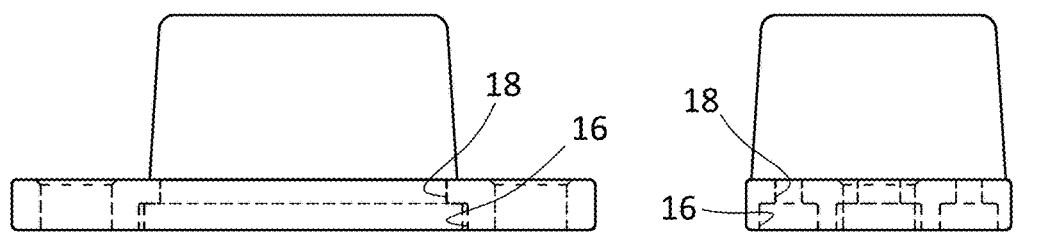
FIG. 6 is a side view of the bumper assembly of FIG. 1.
FIG. 7 is an end view of the bumper assembly of FIG. 1 as seen from an angle perpendicular that of the side view of FIG. 6.
Figure 8:
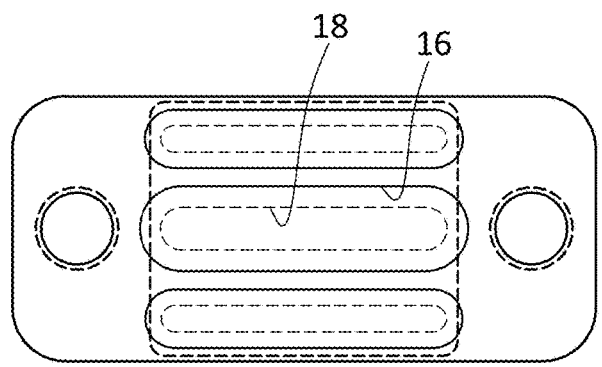
FIG. 8 is a bottom view of the bumper assembly of FIG. 1.
Figure 9:
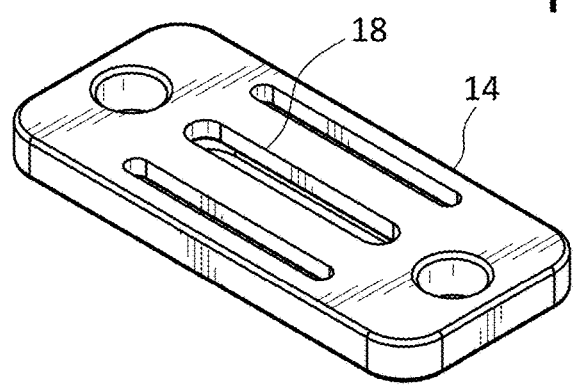
FIG. 9 is an isometric view of the metal base of the bumper assembly of FIG. 1.
Figure 10:
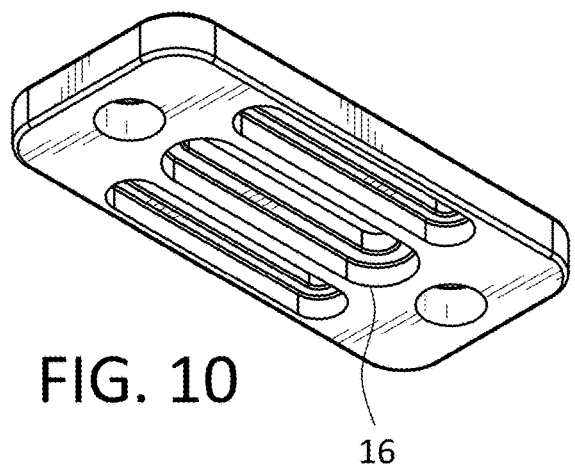
FIG. 10 is an isometric view of the metal base of FIG. 9, rotated to illustrate the bottom surface of the metal base.
Figure 11:
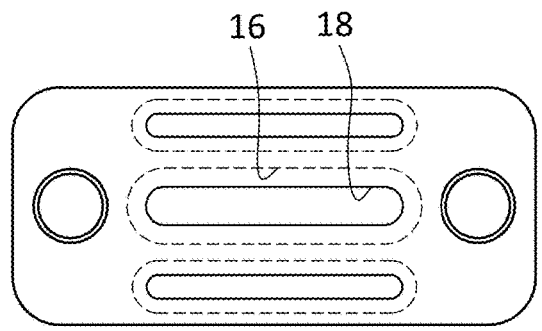
FIG. 11 is a top view of the metal base of FIG. 9.
Figure 12:
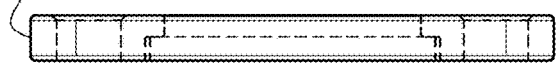
FIG. 12 is a side view of the metal base of FIG. 9.
Figure 13:
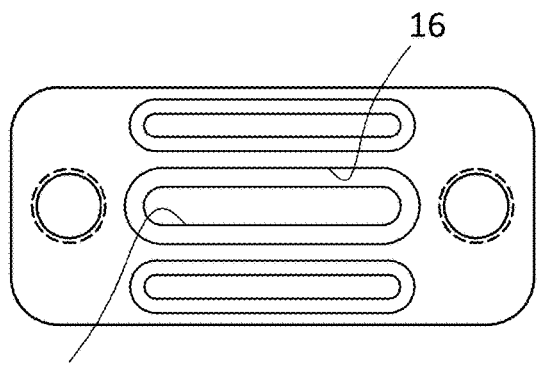
FIG. 13 is a bottom view of the metal base of FIG. 9.

The configuration illustrated in FIGS. 1-8 "traps" the softer impact material of elastic bumper 12 to metal base 14 so that the tension (pull) strength of the impact-absorbing or vibration-absorbing material of bumper 12 exceeds the tearing and lifting effects of the shear, compression and or vibration forces that the softer material of the bumper is subject to during impacts or vibration, especially when the impact or vibration forces are not completely linear. In particular, the elastic polyurethane or rubber material that forms elastic bumper 12, instead of being glued to a flat top surface 38 of metal base 14, is molded in this embodiment into three cavities or hollow chambers 16 in metal base 14, the three cavities or hollow chambers 16 being located under three corresponding orifices 18 that occupy a smaller planar area of metal base 14 than is occupied by hollow chambers 16, and the elastic material within hollow chambers 16 being connected through orifices 18 to the main portion of the elastic material located above the top surface 38 of metal base 14. Hollow chambers 16 extend from respective orifice 18 to a bottom surface 36 of metal base 14, and the elastic material within hollow chambers 16 has a bottom surface 40 that is flush with the bottom surface 36 of metal base 14. Thus, as is seen in FIG. 2, the elastic material, cast into hollow chambers 16, fills the hollow chambers and obscures the view of orifices 18. Orifices 18 are shown in dashed lines in the bottom view of FIG. 8, and orifices 18 as well as hollow chambers 16 are shown in dashed lines in the top view of FIG. 3. With reference to FIGS. 9-13, metal base 14 is shown, illustrating orifices 18 and hollow chambers 16 unobscured by the elastic material that forms the bumper of the bumper assembly. Hollow chambers 16 are shown in dashed lines in the top view of FIG. 11.

The orifices and corresponding hollow chambers of the "trap" can be designed in numerous different ways and take various shapes such as circular, oblong, rectangular, or square orifices and chambers. The key principle is that a first hollow space within the metal base, the orifice, must occupy a smaller planar area than a second hollow space, the hollow chamber, which is below the orifice, to allow the metal to be the "gate keeper." In other words, the metal base is configured to not allow the elastic impact-absorbing or vibration-absorbing material located in the lower hollow chamber to go through the orifice or shear off due to breakage without having to use a higher tension (pull) force than the rated tensile strength of the elastic material multiplied by the relevant cross-sectional area (since tensile strength $\sigma$ is related to the amount of force F required to break the elastic material and cross-sectional area A according to the formula $\sigma=F/A$). The required dimensions of the orifice and the dimensions of the hollow chamber relative to the orifice sufficient to prevent breakage or separation can be determined experimentally. Thus, this design uses the strength of the elastic material to ensure that the elastic material remains joined to the base. In certain embodiments an adhesive may also be employed as a supplemental mechanism for joining the elastic material to the base. The chamber, occupying the larger planar area, is located at the opposite side of the metal base from where the impact or vibration occurs, and can have an open bottom for ease of molding the impact material to the metal. The top surface of the metal base can be flat. For units with two metal end plates to absorb vibration, each metal end plate has at least one orifice and corresponding chamber facing away from the surface of the metal plate on which the main portion of the elastic material is located.

Figure 14:
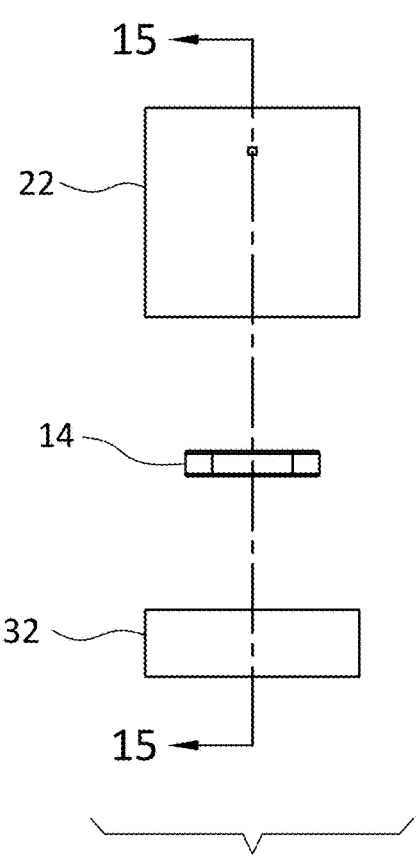
FIG. 14 is an exploded end view of a mold assembly for manufacturing the bumper assembly of FIG. 1, together with the metal base of the bumper assembly.
Figure 15:
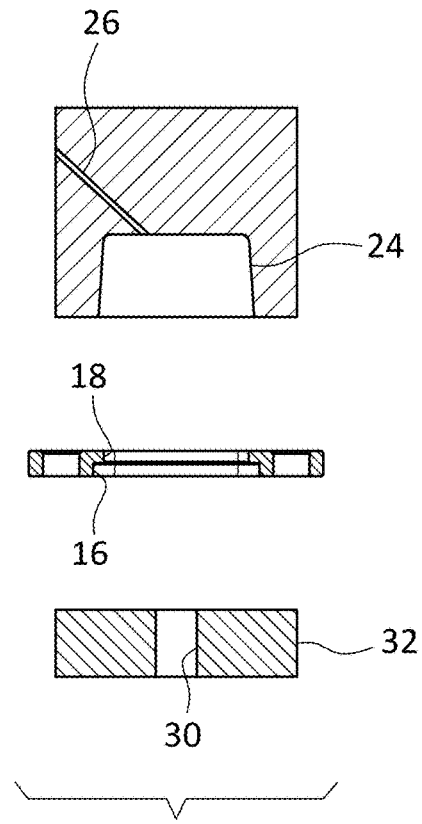
FIG. 15 is a cross-sectional side view of the exploded mold assembly taken along line 15-15 if FIG. 14.
Figure 16:
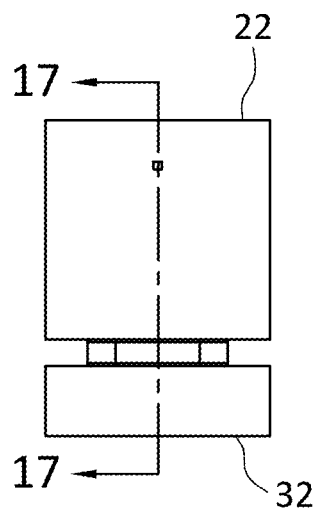
FIG. 16 is an end view of the mold assembly of FIG. 14 with the parts of the mold assembly fitted together.
Figure 17:
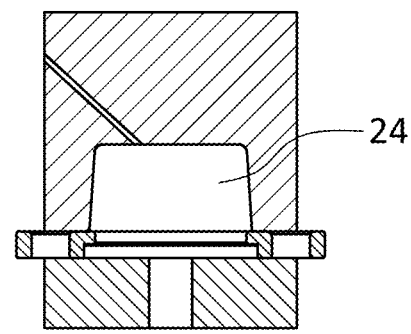
FIG. 17 is a cross-sectional side view of the mold assembly taken along line 17-17 of FIG. 16.
Figure 18:
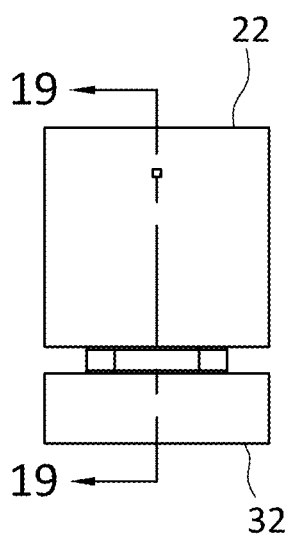
FIG. 18 is an end view of the mold assembly of FIG. 14 with the parts of the mold assembly fitted together and the interior cavity of the mold assembly filled with polyurethane.
Figure 19:
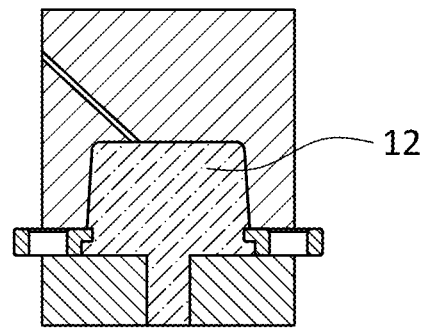
FIG. 19 is a cross-sectional side view of the mold assembly taken along line 19-19 of FIG. 18.
Figures 20, 21:
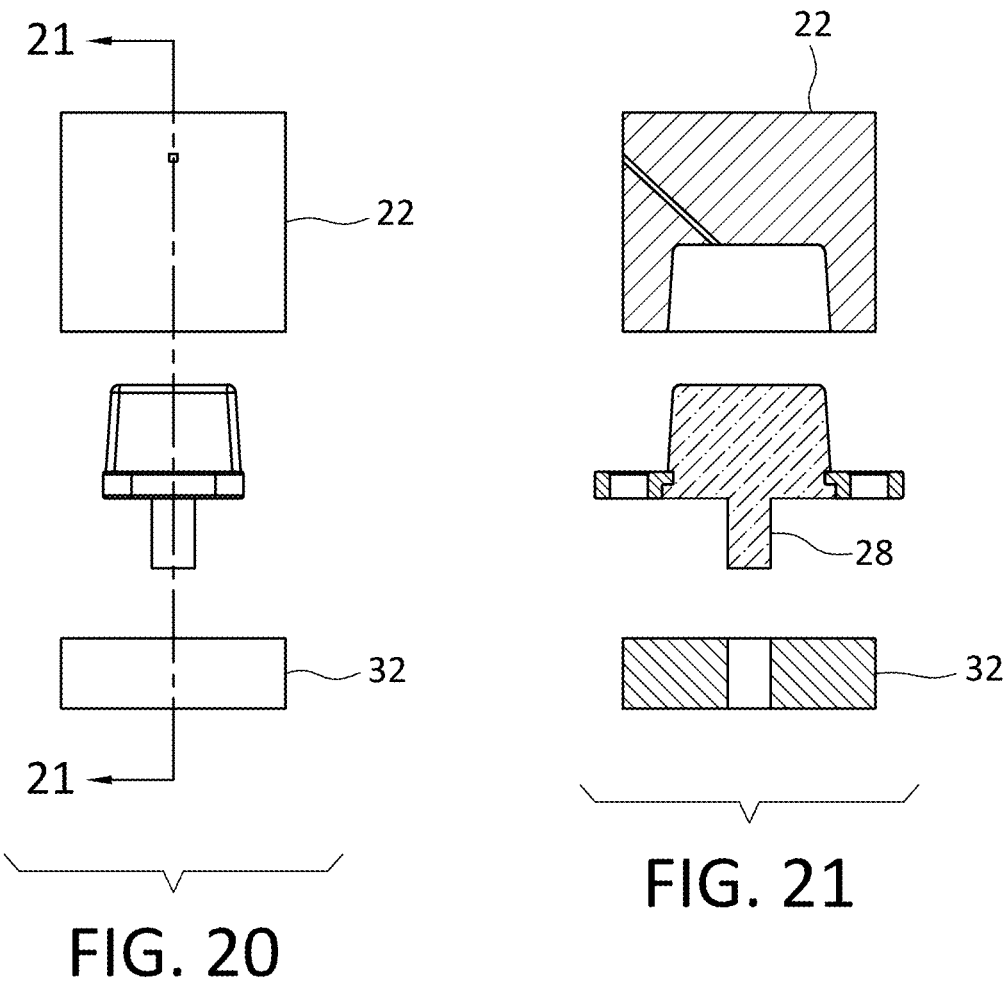
FIG. 20 is an exploded end view of the mold assembly of FIG. 14, together with the bumper assembly after removal from the mold assembly.
FIG. 21 is a cross-sectional side view of the exploded mold assembly taken along line 21-21 of FIG. 20.
Figures 22, 23:
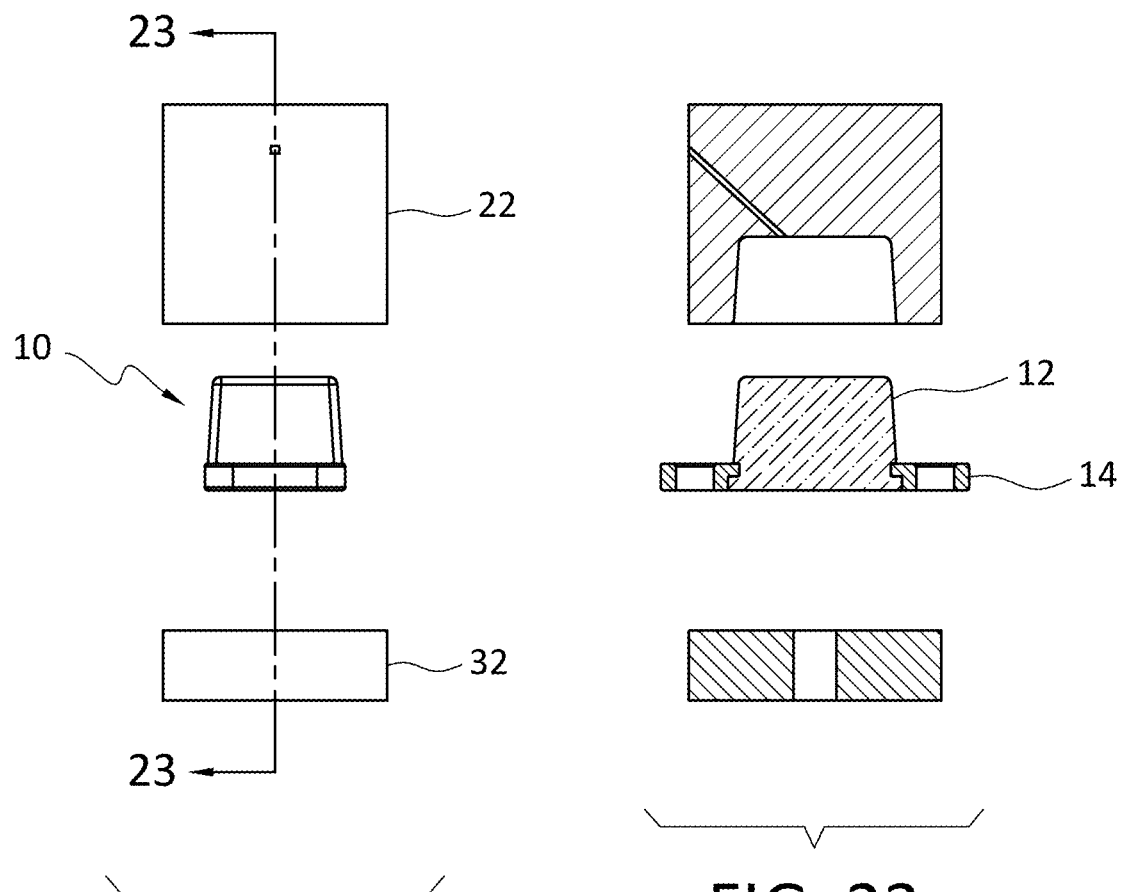
FIG. 22 is an exploded end view of the mold assembly of FIG. 14, together with the bumper assembly after removal from the mold assembly and after excess polyurethane has been removed from the bumper assembly.
FIG. 23 is a cross-sectional side view of the exploded mold assembly taken along line 23-23 of FIG. 22.

FIGS. 14-23 a process by which the bumper assembly of FIGS. 1-8 can be cast in place. Metal base 14 is machined or cast steel, iron, aluminum, or other metal, formed with orifices 18 and hollow cavities 16, and permanent mold 22, which may be made of metal, has an empty tool cavity 24 that shapes the elastic material of the bumper 12 of the final product, and a vent passageway 26, as is illustrated in FIGS. 14 and 15. Metal base 14 is sandwiched between mold 22 and injection gating tool 32, as is illustrated in FIGS. 16 and 17. Rubber, polyurethane, or other elastic material is injected through a passageway 30 in injection gating tool 32 into a hollow chamber and orifice of the metal base and into empty tool cavity 24 as is illustrated in FIGS. 18 and 19. In certain embodiments, injection gating tool 32 may have multiple passageways corresponding to the multiple hollow chambers and orifices. Next, mold 22 and injection gating tool 32 are separated from bumper assembly 10 as illustrated in FIGS. 20 and 21, and then a filling gate portion 28 of the elastic material is removed to yield the final product as is illustrated in FIGS. 22 and 23.

What has been described is a shock-absorbing or vibration-absorbing assembly having elastic material joined to metal, and a process of manufacturing the same. While a particular form of the invention has been illustrated and described, it will be apparent that various modifications and combinations of the invention detailed in the text and drawings can be made without departing form the spirit and scope of the invention. The illustrated bumper is just one representative embodiment of bumpers, buffers, suspensions, and the like, having shock-absorbing or vibration-absorbing material attached to metal. Accordingly, it is not intended that the invention be limited, except as by the appended claims.

What is claimed is:

1. A shock-absorbing or vibration-absorbing bumper assembly, comprising:
   a metal base having a top surface and a bottom surface, the metal base having a thickness between the top surface and the bottom surface, the top surface having at least one orifice extending from the top surface of the metal base and through a first portion of the thickness of the metal base to at least one hollow chamber beneath the top surface, the hollow chamber extending through a second portion of the thickness of the metal base and occupying, throughout the second portion of the thickness of the metal base, a planar area of the metal base parallel to the top surface that is larger than a planar area of the metal base that is occupied, throughout the first portion of the thickness of the metal base, by the orifice, such that the orifice and the hollow chamber form a geometric configuration having a step between the planar area occupied by the orifice throughout the first portion of the thickness of the metal base and the planar area occupied by the hollow chamber throughout the second portion of the thickness of the metal base; and
   an elastic shock-absorbing or vibration-absorbing bumper material secured to the metal base due to the elastic material filling the orifice and the hollow chamber of the metal base and the elastic material filling a region above the top surface of the metal base that has a cross-sectional area parallel to the top surface of the metal base that is larger than the planar area of the metal base that is occupied, throughout the first portion of the thickness of the metal base, by the orifice.

2. An assembly in accordance with claim 1, wherein the metal base is a plate.

3. An assembly in accordance with claim 1, wherein the top surface of the metal base is substantially planar.

4. An assembly in accordance with claim 1, wherein the bottom surface of the metal base is substantially planar.

5. An assembly in accordance with claim 1, wherein the hollow chamber extends from the orifice to the bottom surface of the metal base.

6. An assembly in accordance with claim 5, wherein the elastic material within the hollow chamber has a bottom surface that is flush with the bottom surface of the metal base.

7. An assembly in accordance with claim 1, wherein the at least one orifice is a plurality of orifices and the at least one hollow chamber is a plurality of hollow chambers, and wherein the plurality of orifices extend from the top surface of the metal base to respective ones of the plurality of hollow chambers.

8. An assembly in accordance with claim 1, wherein the metal base comprises at least one fastening hole for securing the metal base in a fixed position.

9. An assembly in accordance with claim 1, wherein the planar area occupied by the orifice and the planar area occupied by the hollow chamber are selected such that the elastic material located in the hollow chamber will not pass through the orifice or shear off due to breakage under impact or vibration forces experienced by the assembly, due to tensile strength of the elastic material.

10. A shock-absorbing or vibration-absorbing assembly, comprising:
    a metal base having a top surface, the top surface having at least one orifice extending from the top surface of the metal base to at least one hollow chamber beneath the top surface, the hollow chamber occupying a planar area of the metal base parallel to the top surface that is larger than a planar area of the metal base that is occupied by the orifice at the top surface; and an elastic shock-absorbing or vibration-absorbing material secured to the metal base due to the elastic material filling the orifice and the hollow chamber of the metal base and the elastic material filling a region above the top surface of the metal base that has a cross-sectional area parallel to the top surface of the metal base that is larger than the planar area of the metal base that is occupied by the orifice at the top surface of the metal base;

wherein the planar area of the metal base that is occupied by the orifice at the top surface of the metal base has an oval shape and the planar area of the metal base parallel to the top surface that is occupied by the hollow chamber has a larger oval shape.

11. A method of securing an elastic shock-absorbing or vibration-absorbing bumper material to a metal base, comprising:

providing a metal base having top a surface and a bottom surface, the metal base having a thickness between the top surface and the bottom surface, the top surface having at least one orifice extending from the top surface of the metal base and through a first portion of the thickness of the metal base to at least one hollow chamber beneath the top surface, the hollow chamber extending through a second portion of the thickness of the metal base and occupying, throughout the second portion of the thickness of the metal base, a planar area of the metal base parallel to the top surface that is larger than a planar area of the metal base that is occupied, throughout the first portion of the thickness of the metal base, by the orifice, such that the orifice and the hollow chamber form a geometric configuration having a step between the planar area occupied by the orifice throughout the first portion of the thickness of the metal base and the planar area occupied by the hollow chamber throughout the second portion of the thickness of the metal base;

providing a mold having a hollow space to be filled with elastic shock-absorbing or vibration-absorbing bumper material;

placing the metal base against the mold;

injecting the elastic material into the hollow chamber and orifice of the metal base and into the hollow space of the mold; and removing the mold from the metal base, so that the elastic material is secured to the metal base due to the elastic material filling the orifice and the hollow chamber of the metal base and the elastic material filling a region above the top surface of the metal base that corresponds to the hollow space of the mold and that has a cross-sectional area parallel to the top surface of the metal base that is larger than the planar area of the metal base that is occupied, throughout the first portion of the thickness of the metal base, by the orifice.

12. A method in accordance with claim 11, wherein the metal base has a bottom surface, and the hollow chamber extends from the orifice to the bottom surface of the metal base.

13. A method in accordance with claim 11, wherein the metal base is a plate.

14. A method in accordance with claim 11, wherein the at least one orifice is a plurality of orifices and the at least one hollow chamber is a plurality of hollow chambers, and wherein the plurality of orifices extend from the top surface of the metal base to respective ones of the plurality of hollow chambers.

15. A method in accordance with claim 11, wherein the planar area of the metal base that is occupied by the orifice at the top surface of the metal base has an oval shape and the planar area of the metal base parallel to the top surface that is occupied by the hollow chamber has a larger oval shape.

16. An assembly in accordance with claim 11, wherein the planar area occupied by the orifice and the planar area occupied by the hollow chamber are selected such that the elastic material located in the hollow chamber will not pass through the orifice or shear off due to breakage under impact or vibration forces experienced by the assembly, due to tensile strength of the elastic material.

17. A method of securing an elastic shock-absorbing or vibration-absorbing material to a metal base, comprising:

providing a metal base having top a surface, the top surface having at least one orifice extending from the top surface of the metal base to at least one hollow chamber beneath the top surface, the hollow chamber occupying a planar area of the metal base parallel to the top surface that is larger than a planar area of the metal base that is occupied by the orifice at the top surface;

providing a mold having a hollow space to be filled with elastic shock-absorbing or vibration-absorbing material;

placing the metal base against the mold;

injecting the elastic material into the hollow chamber and orifice of the metal base and into the hollow space of the mold;

removing the mold from the metal base, so that the elastic material is secured to the metal base due to the elastic material filling the orifice and the hollow chamber of the metal base and the elastic material filling a region above the top surface of the metal base that corresponds to the hollow space of the mold and that has a cross-sectional area parallel to the top surface of the metal base that is larger than the planar area of the metal base that is occupied by the orifice at the top surface of the metal base; and providing an injection gating tool having a hollow passageway through which the elastic material can be injected;

wherein the step of placing the metal base against the mold comprises placing the metal base between the mold and the injection gating tool;

wherein the step of injecting the elastic material comprises injecting the elastic material through a passageway in the injection gating tool into the hollow chamber and orifice of the metal base and into the hollow space of the mold; and wherein the step of removing the mold from the metal base further comprises removing the injection gating tool from the metal base.

18. A method in accordance with claim 17, further comprising removing a filling gate portion of the elastic material after the injection gating tool has been removed from the metal base.

19. A method in accordance with claim 18, wherein the metal base has a bottom surface, and the hollow chamber extends from the orifice to the bottom surface of the metal base, and wherein, after the step of removing the filling gate portion, the elastic material within the hollow chamber has a bottom surface that is flush with the bottom surface of the metal base.

20. A method of securing an elastic shock-absorbing or vibration-absorbing material to a metal base, of securing an elastic shock-absorbing or vibration-absorbing material to a metal base, comprising:
- providing a metal base having top a surface, the top surface having at least one orifice extending from the top surface of the metal base to at least one hollow chamber beneath the top surface, the hollow chamber occupying a planar area of the metal base parallel to the top surface that is larger than a planar area of the metal base that is occupied by the orifice at the top surface;
- providing a mold having a hollow space to be filled with elastic shock-absorbing or vibration-absorbing material;
- placing the metal base against the mold;
- injecting the elastic material into the hollow chamber and orifice of the metal base and into the hollow space of the mold; and
- removing the mold from the metal base, so that the elastic material is secured to the metal base due to the elastic material filling the orifice and the hollow chamber of the metal base and the elastic material filling a region above the top surface of the metal base that corresponds to the hollow space of the mold and that has a cross-sectional area parallel to the top surface of the metal base that is larger than the planar area of the metal base that is occupied by the orifice at the top surface of the metal base;
- wherein the mold comprises a vent passageway.

* * * * *